(12) United States Patent
Jeong et al.

(10) Patent No.: US 9,699,789 B2
(45) Date of Patent: Jul. 4, 2017

(54) MOBILE APPARATUS FOR GENERATING BEACON SIGNAL AND SERVICE METHOD USING THE SAME

(71) Applicant: Samsung Electronics Co., Ltd., Suwon-si, Gyeonggi-do (KR)

(72) Inventors: Hyoyong Jeong, Yongin-si (KR); Inho Park, Seoul (KR); Gyungmin Park, Suwon-si (KR); Hogun Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/836,286

(22) Filed: Aug. 26, 2015

(65) Prior Publication Data
US 2016/0065719 A1     Mar. 3, 2016

(30) Foreign Application Priority Data
Aug. 28, 2014 (KR) ......... 10-2014-0113468

(51) Int. Cl.
| | |
|---|---|
| *H04W 8/00* | (2009.01) |
| *H04L 29/06* | (2006.01) |
| *G01S 1/68* | (2006.01) |
| *H04W 72/04* | (2009.01) |
| *H04W 12/06* | (2009.01) |
| *H04M 1/725* | (2006.01) |
| *H04W 12/10* | (2009.01) |
| *H04W 52/32* | (2009.01) |
| *H04W 48/12* | (2009.01) |
| *H04W 84/18* | (2009.01) |

(52) U.S. Cl.
CPC ....... *H04W 72/0473* (2013.01); *H04L 63/067* (2013.01); *H04M 1/7253* (2013.01); *H04W 12/06* (2013.01); *H04W 12/10* (2013.01); *H04M 1/72572* (2013.01); *H04W 48/12* (2013.01); *H04W 52/325* (2013.01); *H04W 84/18* (2013.01)

(58) Field of Classification Search
CPC .......... H04B 7/15528; H04B 7/15535; H04W 72/0473; H04W 12/06; H04W 12/10; H04W 52/325; H04W 48/12; H04W 84/18; H04W 8/005; H04L 63/067; H04M 1/7253; H04M 1/72572; H04M 1/72533
USPC .................. 455/10, 11.1, 13.1, 15, 424, 420
See application file for complete search history.

(56) References Cited

U.S. PATENT DOCUMENTS

| | | | |
|---|---|---|---|
| 7,024,552 B1 | 4/2006 | Caswell et al. | |
| 7,050,787 B2 * | 5/2006 | Caci ........................ | G01S 5/021 455/404.1 |
| 2002/0183004 A1 * | 12/2002 | Fulton ..................... | H04W 4/06 455/41.1 |
| 2005/0101250 A1 | 5/2005 | Helal et al. | |
| 2006/0132352 A1 * | 6/2006 | Schantz ............... | G01C 21/206 342/125 |

(Continued)

*Primary Examiner* — Nathan Taylor
(74) *Attorney, Agent, or Firm* — Jefferson IP Law, LLP

(57) ABSTRACT

A method of a beacon transmitting a beacon signal is provided. The method including, receiving, by the beacon including a processor, authentication-related information of the device from a server, broadcasting a beacon signal generated based on the authentication-related information, and when a receiver located at an arbitrary location receives the generated beacon signal, receiving beacon service information corresponding to information about the receiver from the server.

27 Claims, 14 Drawing Sheets

(56) References Cited

U.S. PATENT DOCUMENTS

| | | | |
|---|---|---|---|
| 2010/0099435 A1* | 4/2010 | Druzinic-Fiebach ... | H04W 4/02 455/456.3 |
| 2010/0266125 A1* | 10/2010 | Tanaka ................. | H04W 8/205 380/270 |
| 2013/0099920 A1* | 4/2013 | Song .................... | G08B 21/023 340/539.13 |
| 2013/0223279 A1* | 8/2013 | Tinnakornsrisuphap ................. | H04L 41/0809 370/254 |
| 2014/0068778 A1* | 3/2014 | Bhatia .................... | H04W 4/02 726/26 |
| 2015/0005011 A1* | 1/2015 | Nehrenz ................ | H04W 4/02 455/456.3 |
| 2015/0120504 A1* | 4/2015 | Todasco ............... | G06Q 20/322 705/26.61 |
| 2015/0234372 A1* | 8/2015 | Slupik ................... | G05B 15/02 700/275 |
| 2015/0312762 A1* | 10/2015 | Hernandez ........... | H04W 4/008 455/41.2 |
| 2016/0044583 A1* | 2/2016 | Bahram Pour ....... | H04W 4/008 455/456.3 |

* cited by examiner

MOBILE APPARATUS FOR GENERATING BEACON SIGNAL AND SERVICE METHOD USING THE SAME

CROSS-REFERENCE TO RELATED APPLICATION(S)

This application claims the benefit under 35 U.S.C. §119 (a) of Korean patent application filed on Aug. 28, 2014 in the Korean Intellectual Property Office and assigned Serial number 10-2014-0113468, the entire disclosure of which is hereby incorporated by reference.

TECHNICAL FIELD

The present disclosure relates to a service using a beacon signal. More particularly, the present disclosure relates to a mobile apparatus for generating a beacon signal and a service method using the apparatus.

BACKGROUND

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

Normally a beacon is technology or device used for finding a location of a target, e.g., a person, a thing, etc., through wireless communication technology such as infrared or Bluetooth. In a typical service using a beacon, a beacon signal generator installed by a beacon service provider is fixed at a specific location, and a device receives information contained in a beacon signal generated by the beacon signal generator. Meanwhile, with smart phones increasing in popularity, services using a beacon are now diversified. For example, when a user who carries a mobile device enters a shop having a beacon, customized information such as product properties, prices, or a purchase history may be automatically offered to a customer. Additionally, when a user enters a hotel lobby, a welcome message is offered on a screen of a user's mobile device, and also guiding information about hotel facilities such as a swimming pool, restaurants, and the like may be offered to a user's mobile device by recognizing the location of the device. Additionally, in a case of museum or art gallery, related information may be offered in the form of voice, text or video to a user's mobile device that is approaching a work of art or an exhibit.

In such a typical service using a beacon, a beacon generator that always generates a beacon signal is fixed to a specific location, and a device capable of receiving the beacon signal is moved together with a user. Further, all devices located within a coverage of a certain beacon generator merely receive the same data from the beacon generator. Therefore, each individual user does not have the ability to select desired information and also cannot prevent an offer of unverified information.

Meanwhile, in a typical case of performing a distance measurement using a beacon so as to offer a service based on the measured distance, only the received signal strength indication (RSSI) of a beacon signal received by a user's mobile device is used for determining such a distance. However, this has no consideration for the direction of an antenna, signal distortion due to obstacles, randomness of a Bluetooth signal using a frequency hopping scheme, and the like.

The above information is presented as background information only to assist with an understanding of the present disclosure. No determination has been made, and no assertion is made, as to whether any of the above might be applicable as prior art with regard to the present disclosure.

SUMMARY

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services.

Aspects of the present disclosure are to address at least the above-mentioned problems and/or disadvantages and to provide at least the advantages described below. Accordingly, an aspect of the present disclosure is to provide a method and apparatus for offering beacon service information by using a mobile beacon signal transmitter and a fixed receiver.

In accordance with aspect of the present disclosure, a method of a beacon transmitting a beacon signal to a device is provided. The method include receiving, by a beacon including a processor, authentication-related information of the device from a server, broadcasting a beacon signal generated based on the authentication-related information, and when a receiver located at an arbitrary location receives the generated beacon signal, receiving beacon service information corresponding to information about the receiver from the server.

In accordance with an aspect of the present disclosure, a method of a server offering a beacon service is provided. The method includes transmitting, by the server including a processor and to a device that joins the beacon service, authentication-related information of the device for receiving beacon service information, receiving, from a receiver located at an arbitrary location, a beacon signal broadcasted by the device, authenticating the device broadcasting the beacon signal based on the authentication-related information contained in the received beacon signal, and when the device is authenticated, transmitting the beacon service information corresponding to information about the receiver to at least one of the device and the receiver.

In accordance with another aspect of the present disclosure, a device for transmitting a beacon signal is provided. The device includes a communication unit configured to perform a data communication, and a control unit configured to receive authentication-related information of the device from a server, to broadcast a beacon signal generated based on the authentication-related information, and when a receiver located at an arbitrary location receives the generated beacon signal, to receive beacon service information corresponding to information about the receiver from the server.

In accordance with another aspect of the present disclosure, a server for offering a beacon service is provided. The server includes a communication unit configured to perform a data communication, and a control unit configured to transmit, to a device that joins the beacon service, authentication-related information of the device for receiving beacon service information, to receive, from a receiver located at an arbitrary location, a beacon signal broadcasted by the device, to authenticate the device broadcasting the beacon signal based on the authentication-related information contained in the received beacon signal, and when the device is authenticated, to transmit the beacon service information corresponding to information about the receiver to at least one of the device and the receiver.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
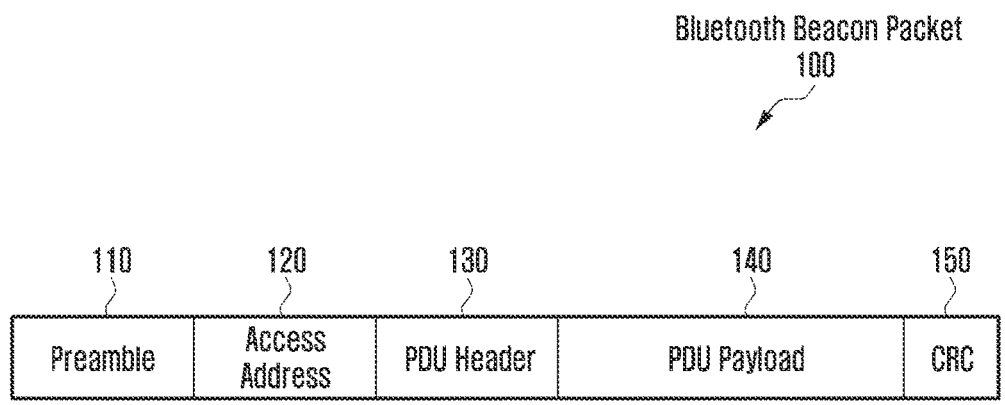
FIG. 1 is a diagram illustrating a packet configuration of a beacon signal in accordance with an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure may be embodied in many different forms and should not be construed as limited to the embodiments set forth herein. Rather, the disclosed embodiments are provided so that this disclosure will be thorough and complete, and will fully convey the scope of this disclosure to those skilled in the art. The principles and features of the present disclosure may be employed in varied and numerous embodiments without departing from the scope of the disclosure.

The terms used in the present disclosure are only used to describe specific various embodiments, and are not intended to limit the present disclosure. As used herein, the singular forms are intended to include the plural forms as well, unless the context clearly indicates otherwise.

At the outset, the terms used herein are defined. In this disclosure, a beacon may refer to an apparatus for generating a uniform signal or the signal itself generated at that apparatus.

Meanwhile, a signal generated at a beacon according to this disclosure may be delivered in a wireless communication manner such as infrared or Bluetooth. The generation of a signal at a beacon according to this disclosure is not limited to a specific manner or technique.

In this disclosure, a mobile beacon generator may refer to a beacon generator embedded in a device having mobility. Additionally, a beacon generator itself may be a device having mobility. A mobile beacon generator may be also referred to as a device, a user device, a wearable device, or the like in this disclosure.

FIGS. 1 through 14, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1 is a diagram illustrating a packet configuration of a beacon signal in accordance with an embodiment of the present disclosure.

Referring to FIG. 1, a (Bluetooth) beacon packet 100 is illustrated, where the beacon packet 100 may include a preamble 110, an access address 120, a packet data unit (PDU) header 130, a PDU payload 140, and a cyclical redundancy check (CRC) 150.

The preamble 110 may contain information associated with frequency synchronization, symbol timing estimation, automatic gain control, and the like.

The access address 120 may contain information associated with a physical link access code.

The PDU header 130 may contain information associated with logical transport, logical link identifiers, and the like.

The PDU payload 140 may contain information associated with a logical link control and adaptation protocol (L2CAP) signal, L2CAP frames, user data, and the like.

The CRC 150 may contain information associated with data transport error detection, or the like.

Meanwhile, the PDU payload 140 may contain information associated with a beacon signal. Here, information associated with a beacon signal may be unique identification information assigned to the beacon signal, for example, a beacon identification (ID) (e.g., 94 d7 71 fA 61 01). Also, such a beacon ID may be linked to specific location information (e.g., latitude and longitude values, etc.) of a beacon transmitter that transmits a beacon signal, and/or linked to specific function information (e.g., application execution, etc.). Such information may be contained in any other part other than the PDU payload.

Figure 2:
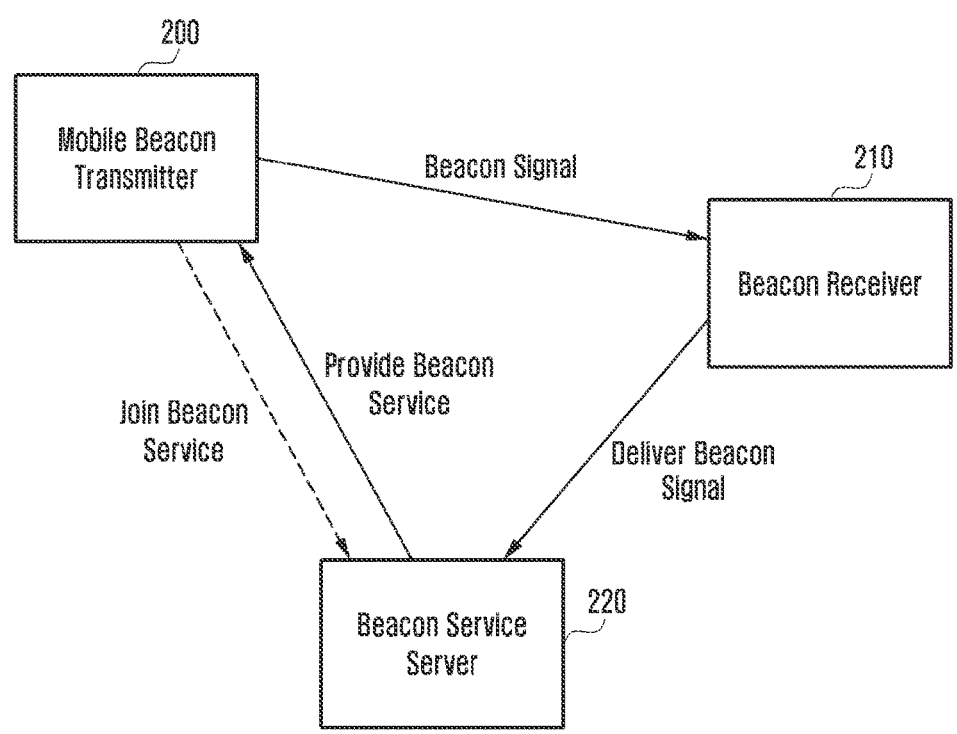
FIG. 2 is a diagram illustrating a method for providing a service using a mobile beacon generator in accordance with an embodiment of the present disclosure.

FIG. 2 is a diagram illustrating a method for providing a service using a mobile beacon generator in accordance with an embodiment of the present disclosure.

Referring to FIG. 2, a mobile beacon transmitter 200, a beacon receiver 210 and a beacon service server 220 are illustrated, where contrary to a typical fixed beacon transmitter, a beacon transmitter according to this disclosure may be the mobile beacon transmitter 200 capable of mobility. In various embodiments, the mobile beacon transmitter 200 may be a mobile terminal, a cellular phone, a smart phone, or any other electronic device that includes a beacon transmitter and has mobility. Additionally, the mobile beacon transmitter 200 may be a wearable device.

A description in this disclosure is made on the assumption that a user of the mobile beacon transmitter 200 has already joined a beacon service. A user may join a plurality of beacon services. In a case where the mobile beacon transmitter 200 is a wearable device, a user can join a beacon service at a primary device, e.g., a smart phone, pairing with the wearable device. Also, a user can join a beacon service by accessing the beacon service server 220 directly at the mobile beacon transmitter 200. In a case of joining a beacon service, a user of the mobile beacon transmitter 200 may register in advance a device to be used for each account.

The mobile beacon transmitter 200 may transmit a signal that is reachable to a certain distance. A signal generated by the mobile beacon transmitter 200 has no limitations in type, size and form. Additionally, this signal may be transmitted using wireless communication technologies such as infrared, frequency, or Bluetooth. A description in this disclosure is made on the assumption that a beacon signal is transmitted using Bluetooth.

The beacon receiver 210 may receive a beacon signal transmitted from the mobile beacon transmitter 200. Once receiving a signal from the mobile beacon transmitter 200, the beacon receiver 210 may recognize the approach of the mobile beacon transmitter 200. At least one beacon receiver 210 may exist and communicate with the beacon service server 220 based on information about the received signal. The beacon receiver 210 may transmit the received signal itself to the beacon service server 220, or alternatively extract user-related information from the received beacon signal and then transmit the extracted information to the beacon service server 220. User-related information contained in the beacon signal may include at least one of a unique identifier of the mobile beacon transmitter 200, information about transmitted signal strength of a beacon signal, and an encryption key to be used for verifying the mobile beacon transmitter 200.

In various embodiments of the present disclosure, the beacon receiver 210 may be a smart home appliance which does not merely have a function of sending the received beacon signal to the beacon service server 220, but also performs various functions according to the received beacon signal. A smart home appliance refers to intelligent electronic devices for offering some household functions through wired and/or wireless home network. For example, a smart home appliance may include a door lock, a television, a robot cleaner, an oven, a washing machine, a computer, a printer, a camera, a refrigerator, lighting equipment, an air conditioner, and the like.

The beacon service server 220 may store therein subscriber information about a user who joins a beacon service. This subscriber information may include at least one of a user ID, a unique user identifier (UUID), a unique identifier of the mobile beacon transmitter 200 from which a user will receive information associated with a beacon service, information about an authentication key to be used for verifying the mobile beacon transmitter 200, a number of transmitters to be used by a user who joins a beacon service, and information about a service commodity joined by a user. Here, an authentication key for verifying the mobile beacon transmitter 200 may be a one-time password (OTP), and information about the authentication key may be an OTP seed to be used for creating the OTP. Also, a mobile OTP (MOTP) based on a universal subscriber identity module (USIM) may be used. In this disclosure, an OTP seed may have the same meaning as basic information for OTP creation.

In response to the membership application from a user, the beacon service server 220 may create a UUID and an OTP seed for each user ID. The created UUID and OTP seed may be stored in the form of subscriber information in the beacon service server 220.

Meanwhile, the beacon service server 220 and the beacon receiver 210 may be operated by the same operator. The beacon service server 220 that receives a beacon signal from the beacon receiver 210 may offer beacon service information to a user, based on an identifier of the mobile beacon transmitter 200 that transmits the beacon signal to the beacon receiver 210.

Such beacon service information, i.e., information offered to the mobile beacon transmitter 200 by the beacon service server 220, may be information predefined according to a user's preference, offered by a user at the time of joining a beacon service, or a user's location (i.e., the location of the beacon receiver 210).

In a case where the mobile beacon transmitter 200 is a device, such as a smart phone, having a communication function, the beacon service server 220 may transmit predefined information directly to the device. Additionally, if the mobile beacon transmitter 200 is a wearable device, the beacon service server 220 may provide predefined information directly to the wearable device or any other device pairing with the wearable device.

Figure 3:
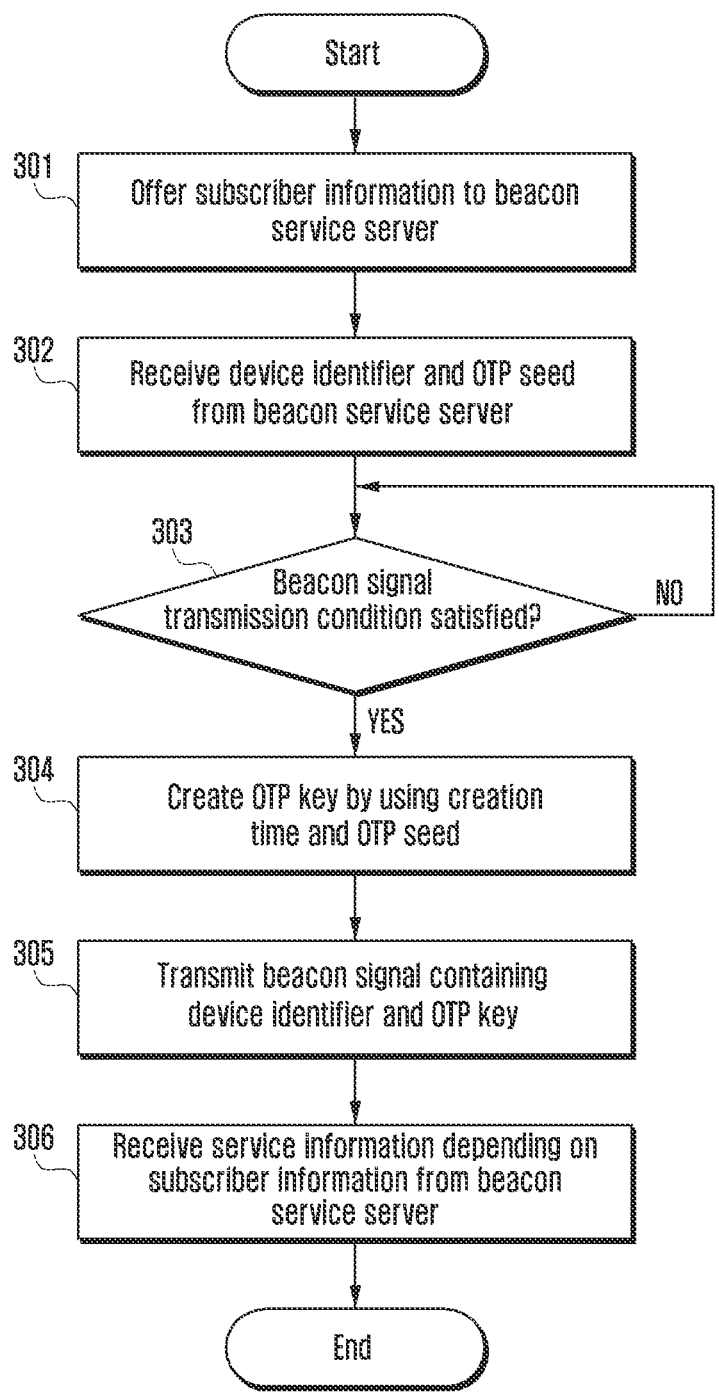
FIG. 3 is a flow diagram illustrating an operation of a mobile beacon transmitter in accordance with an embodiment of the present disclosure.

FIG. 3 is a flow diagram illustrating an operation of a mobile beacon transmitter in accordance with an embodiment of the present disclosure.

Referring to FIG. 3, a flow diagram is illustrated, where a user may offer his or her subscriber information to a beacon service server at operation 301. This subscriber information may be offered directly to a beacon service provider in an offline manner or in an online manner using a personal computer (PC) or the like. Alternatively, using a wireless communication network, the mobile beacon transmitter may offer user's subscriber information to the beacon service server.

Here, the subscriber information offered by a user may include at least one of a user ID, a UUID, a unique identifier of the mobile beacon transmitter from which a user will receive information associated with a beacon service, a number of transmitters to be used by a user who joins a beacon service, and information about a service commodity joined by a user. When joining a beacon service, a user may set his or her favorite field or a category of desired information. Therefore, each user can receive specialized or personalized information.

In various embodiments of the present disclosure, the mobile beacon transmitter may be a mobile terminal, a cellular phone, a smart phone, a wearable device, or any other electronic device that includes a beacon transmitter and has mobility.

The beacon service server that receives subscriber information from the mobile beacon transmitter may create the UUID, which is a unique identifier for a user device, and an OTP seed for creating an OTP key. Then, at operation 302, the mobile beacon transmitter may receive the UUID and the OTP seed from the beacon service server.

At operation 303, the mobile beacon transmitter may determine whether a beacon signal transmission condition is satisfied.

Here, a condition for transmitting a beacon signal may be a case in which a user enters an input for generating a beacon signal. Additionally, such a condition may be a case in which any emergency situation occurs as a sensing result of a heartbeat sensor or the like equipped in the mobile beacon generator. Also, such a condition may be a case in which any other device (e.g., a wearable device, etc.) connected to the mobile beacon transmitter requests the mobile beacon transmitter to generator a beacon signal so as to locate the mobile beacon transmitter.

If, at operation 303, the beacon signal transmission condition is not satisfied, the flow diagram returns to operation 303 until the condition is satisfied.

The mobile beacon transmitter may generate a beacon signal to be transmitted. This beacon signal may contain authentication information to be used for verifying the mobile beacon transmitter and a user thereof. If, at operation 303, the beacon signal transmission condition is satisfied, then the mobile beacon transmitter may create, at operation 304, the OTP key by using a creation time and the OTP seed received from the beacon service server and then transmit, at operation 305, a beacon signal containing the created OTP key and the UUID offered by the server. If the creation time of the OTP key is applied in minutes, the created OTP key may have different values in minutes.

The beacon receiver may receive the beacon signal, add a unique identifier thereof to the beacon signal, and transmits the beacon signal to the beacon service server. The unique identifier of the beacon receiver is offered to allow the beacon service server to identify the beacon receiver and recognize a geographical location of the beacon receiver. Meanwhile, the beacon service server may verify the mobile beacon transmitter and a user by using the UUID and the OTP key contained in the beacon signal, and also transmit service information associated with the geographical location of the beacon receiver based on subscriber information stored therein.

At operation 306, the mobile beacon transmitter may receive service information depending on subscriber information from the beacon service server.

Figure 4:
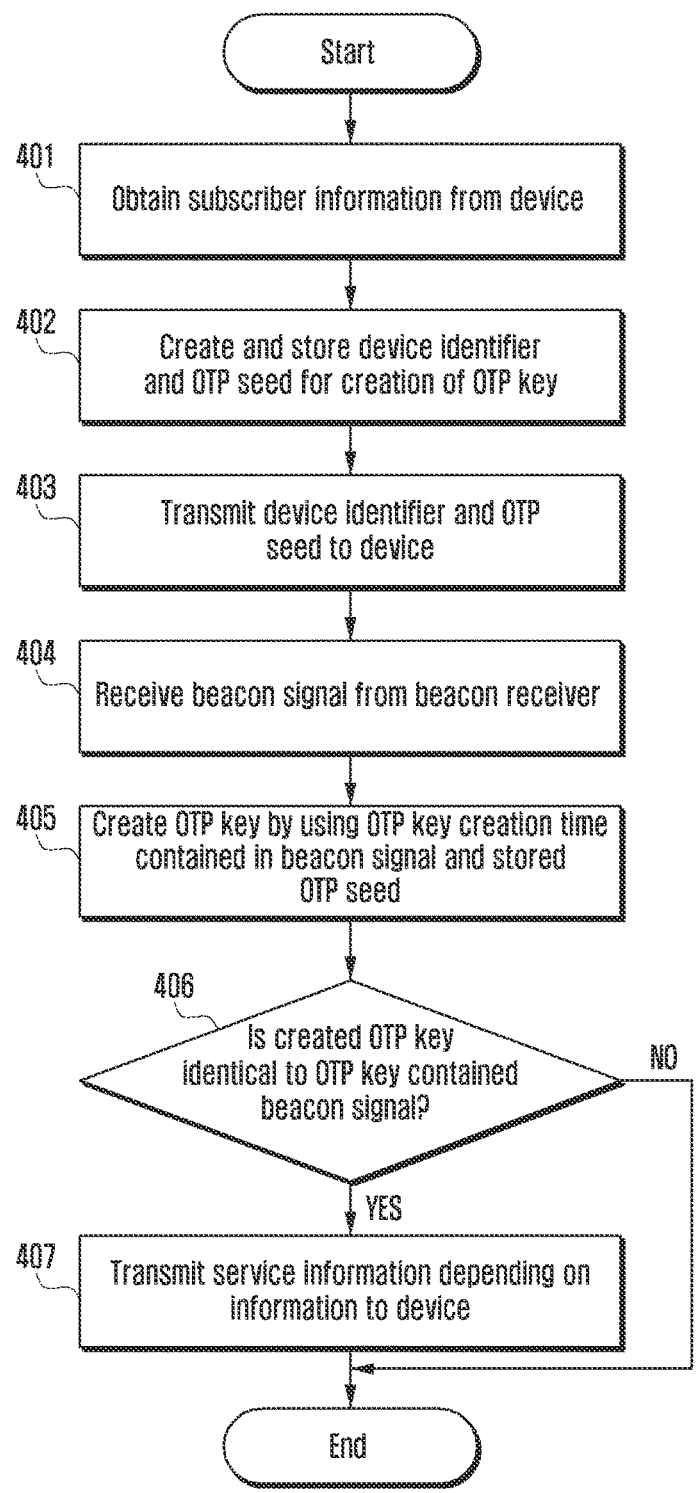
FIG. 4 is a flow diagram illustrating an operation of a beacon service server in accordance with an embodiment of the present disclosure.

FIG. 4 is a flow diagram illustrating an operation of a beacon service server in accordance with an embodiment of the present disclosure.

Referring to FIG. 4, a flow diagram is illustrated, where a beacon service server may obtain subscriber information from a mobile beacon transmitter at operation 401. This subscriber information obtained from a user may include at least one of a user ID, a UUID, a unique identifier of the mobile beacon transmitter from which a user will receive information associated with a beacon service, a number of transmitters to be used by a user who joins a beacon service, and information about a service commodity joined by a user. When joining a beacon service, a user may set his or her favorite field or a category of desired information. Therefore, the beacon service server can offer specialized or personalized information to each user.

For each user ID in the subscriber information, the beacon service server may create at operation 402 a UUID, which is a unique identifier for a user device, and an OTP seed for creating an OTP key. Also, at operation 402, the beacon service server may store the created UUID, the created OTP seed, and subscriber information.

Meanwhile, at operation 403, the beacon service server may transmit the created UUID and the OTP seed to the mobile beacon transmitter.

Thereafter, at operation 404, the beacon service server may receive a beacon signal from the beacon receiver. Namely, the beacon receiver may receive a beacon signal from the mobile beacon transmitter, add a unique identifier thereof to the beacon signal, and then deliver the beacon signal to the beacon service server. The unique identifier of the beacon receiver is offered to allow the beacon service server to identify the beacon receiver and recognize a geographical location of the beacon receiver.

At operation 405, the beacon service server may extract the UUID and the OTP key from the received beacon signal and create an the OTP key thereof by using a stored OTP seed corresponding to the extracted UUID and a creation time of the extracted OTP key.

Thereafter, at operation 406, the beacon service server may determine whether the created OTP key is identical to the OTP key contained in and extracted from the received beacon signal.

If, in operation 406, the beacon service server determines that the created OTP key is not identical to the OTP key, the received beacon signal is regarded as an unverified beacon signal. Therefore, the beacon service server may transmit a verification failure message to the beacon receiver or to the mobile beacon transmitter having the extracted UUID, or alternatively terminate a process without any action.

If, at operation 406, the beacon service server determines that the created OTP key and the OTP key are identical to each, the beacon service server may transmit, at operation 407, beacon service information to the device according to subscriber information corresponding to the UUID, based on location information depending on a unique identifier of the beacon receiver contained in the beacon signal. Here, the beacon service information refers to service information stored previously in the beacon service server according to subscriber information.

Operation 407 corresponds to one embodiment for offering predefined information to the device. Predefined information may be varied in various embodiments. At operation 407, the beacon service server may be operated as the following embodiments.

First, if a beacon service is a service for offering information associated with a specific location to a user, the user may select desired information at the time of joining the beacon service. Alternatively, the user may select his or her favorite field or a type of desired information. The beacon service server may offer, to the user, information associated with predetermined information, user's favorite field, or user's desired information type. If the mobile beacon transmitter is a device (e.g., a smart phone) having a communication function, the beacon service server may offer beacon service information directly to the device. If the mobile beacon transmitter is a wearable device, the beacon service server may transmit beacon service information to the wearable device or to a primary device pairing with the wearable device.

According to another embodiment, a beacon signal received from the beacon receiver, by the beacon service server at operation 404, may contain an identifier indicating an emergency situation. In this case, the beacon service server may perform a report for a quick reaction. At this time, location information may be also transmitted for a quick reaction, and this location may be the location of the beacon receiver or the location of the mobile beacon transmitter.

According to an embodiment, the beacon service server may measure the location of the mobile beacon transmitter. Related descriptions will be given below with reference to FIGS. 5 to 10.

Figure 5:
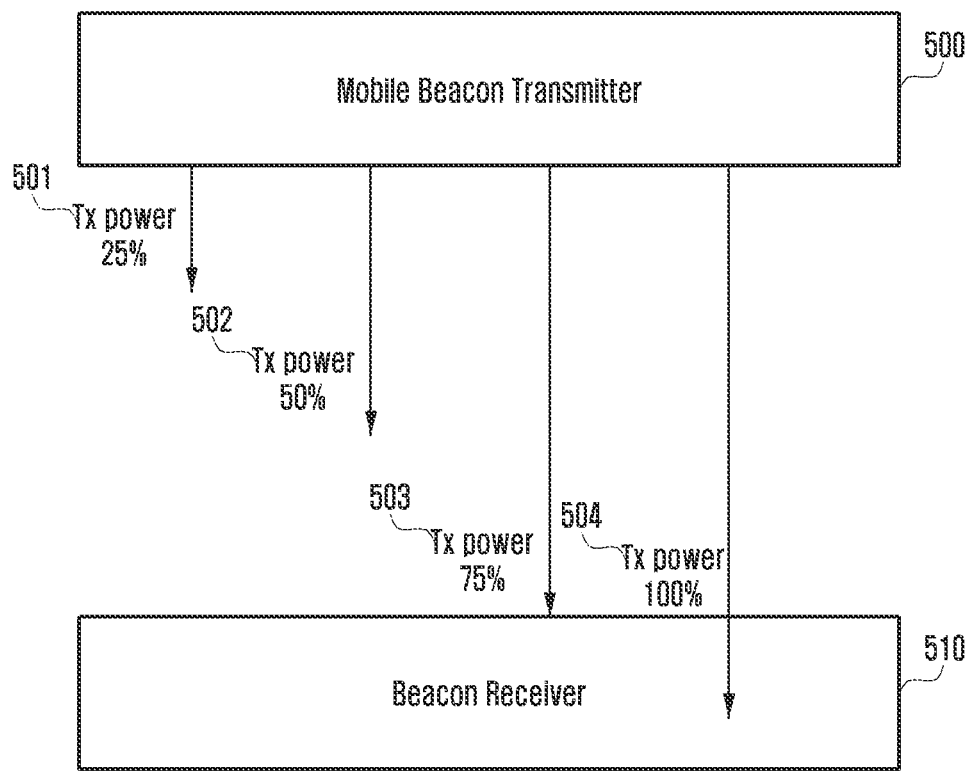
FIG. 5 is a diagram illustrating a method for measuring a location of a mobile beacon transmitter in accordance with an embodiment of the present disclosure.

FIG. 5 is a diagram illustrating a method for measuring a location of a mobile beacon transmitter in accordance with an embodiment of the present disclosure.

Referring to FIG. 5, a mobile beacon transmitter 500 and a beacon receiver 510 are illustrated, where the mobile beacon transmitter 500 may transmit a beacon signal by varying transmission (Tx) power of the beacon signal. A reachable distance of the beacon signal may be varied depending on the transmission power of the beacon signal.

As shown in FIG. 5, when a maximum transmission power is denoted by 100%, the mobile beacon transmitter 500 may transmit beacon signals with power of 25% (501), 50% (502), 75% (503), and 100% (504). If a signal 503 having 75% transmission power and a signal 504 having 100% transmission power arrive at the beacon receiver 510, the mobile beacon transmitter 500 may determine that the beacon receiver 510 is located at a distance corresponding to the signal 503 having 75% transmission power, namely having relatively lower transmission power.

In this manner, distance information about the mobile beacon transmitter 500 may be calculated using transmission power of a beacon signal that arrives at the beacon receiver. In a case of further dividing transmission power, a more detailed measurement of distance can be possible. Additionally, if a time-dependent analysis of transmission power of a beacon signal is made, it is possible to determine whether the mobile beacon transmitter 500 is approaching or receding, namely, to obtain information about a motion of the mobile beacon transmitter 500.

Therefore, a method for transmitting a beacon signal may offer a variety of beacon services based on a distance between the mobile beacon transmitter 500 and the beacon receiver 510 or information associated with a motion of the mobile beacon transmitter 500.

Figure 6:
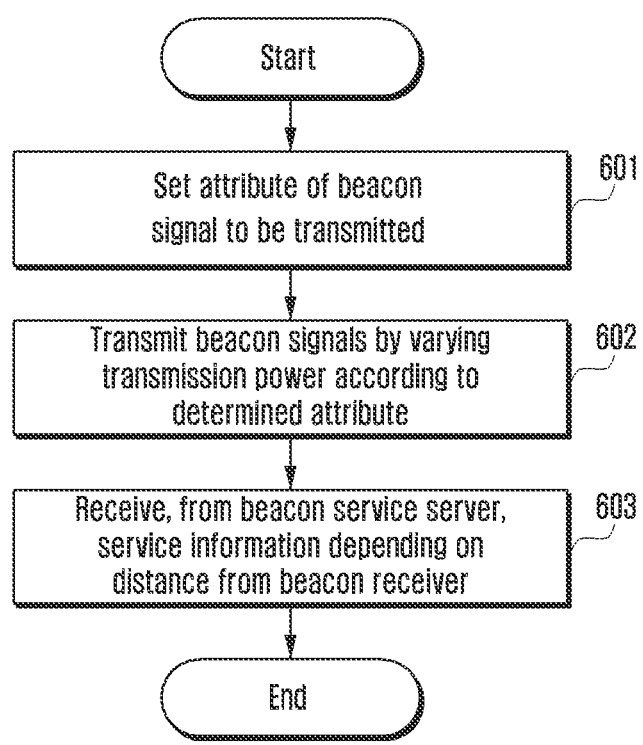
FIG. 6 is a flow diagram illustrating an operation of a mobile beacon transmitter for transmitting a beacon signal by varying a transmission power in accordance with an embodiment of the present disclosure.

FIG. 6 is a flow diagram illustrating an operation of a mobile beacon transmitter for transmitting a beacon signal by varying a transmission power in accordance with an embodiment of the present disclosure.

Referring to FIG. 6, a flow diagram is illustrated, such that at operation 601, a mobile beacon transmitter may determine/set an attribute of a beacon signal to be transmitted. Here, an attribute of a beacon signal may be one of a transmission power of a beacon signal, a transmission cycle of a beacon signal, and a number of beacon signals to be transmitted.

At operation 602, the mobile beacon transmitter may transmit at least one beacon signal by varying the transmission power thereof according to the determined attribute of a beacon signal. Then the beacon receiver may receive beacon signals with different transmission power values, add a unique identifier thereof to the beacon signals, and transmit the beacon signals to a beacon service server. Thereafter, the beacon service server may obtain distance or motion information of the mobile beacon transmitter from transmission power values of the received beacon signals and then, based on the obtained information, transmit beacon service information to the mobile beacon transmitter.

At operation 603, the mobile beacon transmitter may receive, from the beacon service server, beacon service information depending on a distance from the beacon receiver. This beacon service information will be described in detail with reference to FIGS. 7 to 11.

Figure 7:
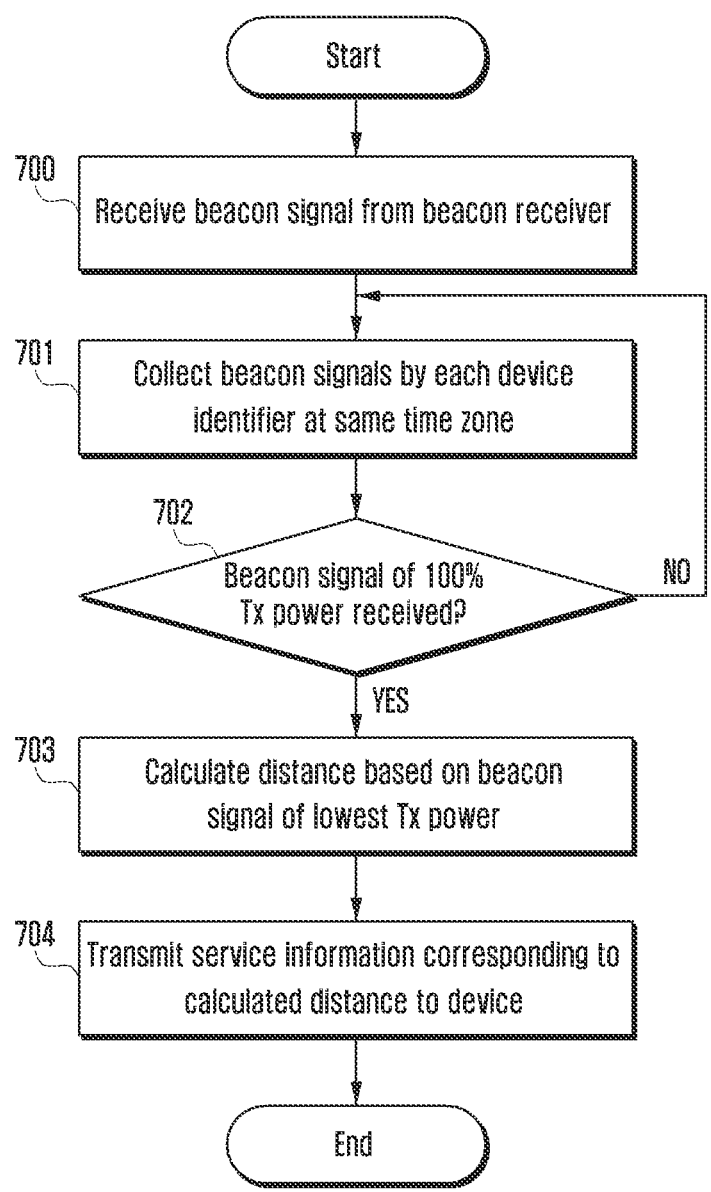
FIG. 7 is a flow diagram illustrating an operation of a beacon service server where a mobile beacon transmitter transmits a beacon signal by varying a transmission power in accordance with an embodiment of the present disclosure.

FIG. 7 is a flow diagram illustrating an operation of a beacon service server where a mobile beacon transmitter transmits a beacon signal by varying a transmission power in accordance with an embodiment of the present disclosure.

Referring to FIG. 7, a flow diagram is illustrated, such that at operation 700, a beacon service server may receive at least one beacon signal from a beacon receiver. This beacon signal may contain an UUID of a mobile beacon transmitter that initially transmits the beacon signal, authentication information to be used for authenticating a user of the mobile beacon transmitter, and a unique identifier of the beacon receiver.

At operation 701, the beacon service server may collect the received beacon signals according to each UUID contained in the beacon signal. This is for measuring a distance between the mobile beacon transmitter and the beacon receiver, based on transmission power values of the beacon signals received at the same time zone.

At operation 702, the beacon service server may determine whether a beacon signal having 100% transmission power is received. If such a beacon signal is not received yet, the beacon service server may continuously collect beacon signals according to each UUID until a beacon signal having 100% transmission power is received. If only a beacon signal having 100% transmission power is received, it means that the mobile beacon transmitter is located at the maximum reception distance of the beacon receiver. If even a beacon signal having 100% transmission power is not received, it means that the beacon receiver cannot receive a beacon signal transmitted from the mobile beacon transmitter and the flow diagram returns to operation 701.

When a beacon signal having 100% transmission power is received, the beacon service server may calculate, at operation 703, a distance of the mobile beacon transmitter from a beacon signal having the lowest transmission power among all beacon signals received from the mobile beacon transmitter having the same UUID. Namely, the beacon service server may store in advance information about a distance of the mobile beacon transmitter corresponding to each transmission power value and also determine a distance corresponding to a received beacon signal having the lowest transmission power value as a distance between the mobile beacon transmitter and the beacon receiver.

At operation 704, the beacon service server may transmit beacon service information corresponding to the calculated distance to the mobile beacon transmitter.

Figure 8:
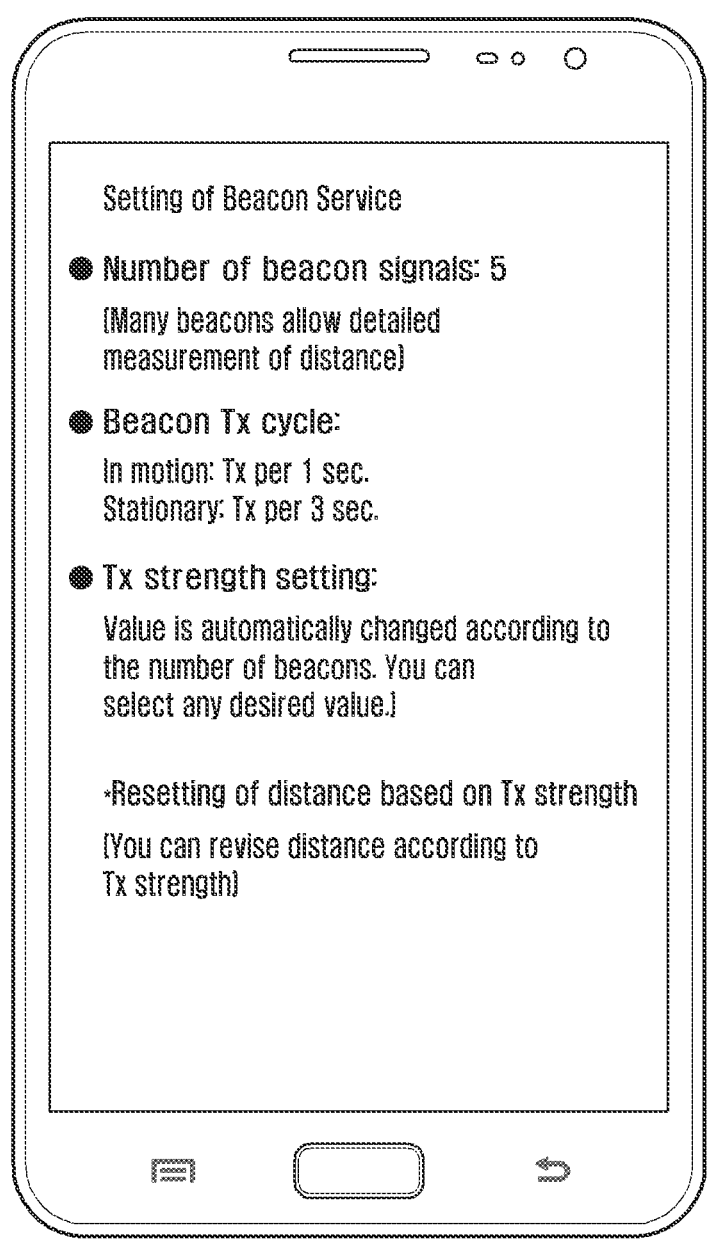
FIG. 8 is a diagram illustrating a user interface for determining an attribute of a beacon signal at a mobile beacon transmitter in accordance with an embodiment of the present disclosure.

FIG. 8 is a diagram illustrating a user interface for determining an attribute of a beacon signal at a mobile beacon transmitter in accordance with an embodiment of the present disclosure.

Referring to FIG. 8, various settings within a user interface are illustrated, where a user may set an attribute of a beacon signal on a display screen of a mobile beacon transmitter. Here, settable attributes of a beacon signal may be a number of beacon signals to be transmitted, a transmission cycle of a beacon signal, and/or transmission power of a beacon signal.

An increase in the number of beacon signals to be transmitted during a certain transmission cycle may allow a more detailed measurement of distance. If the mobile beacon transmitter is moved, a beacon signal may be transmitted in a shorter transmission cycle in order to measure a distance between the mobile beacon transmitter and the beacon receiver more exactly. If the mobile beacon transmitter remains stationary, it may be set to transmit a beacon signal in a longer transmission cycle in order to reduce battery consumption of the mobile beacon transmitter.

The user interface shown in FIG. 8 indicates beacon signal transmission per one second in a case where the mobile beacon transmitter is in motion, and per three seconds in a case where the mobile beacon transmitter remains stationary. Also, a global positioning system (GPS) sensor and/or an acceleration sensor equipped in the mobile beacon transmitter may be used to determine whether the mobile beacon transmitter is moved or not.

The transmission power of a beacon signal to be transmitted by the mobile beacon transmitter may be automatically determined depending on the number of beacon signals which is set by a user. Additionally or alternatively, such transmission power may be selected by a user.

Meanwhile, a distance between the mobile beacon transmitter and the beacon receiver according to the transmission power of the mobile beacon transmitter may use a predetermined value. However, considering the occurrence of errors due to a communication environment, such a distance depending on transmission power may be resettable by a user. The user interface shown in FIG. 8 includes an item for resetting a transmission distance of the mobile beacon transmitter according to transmission power.

Figure 9:
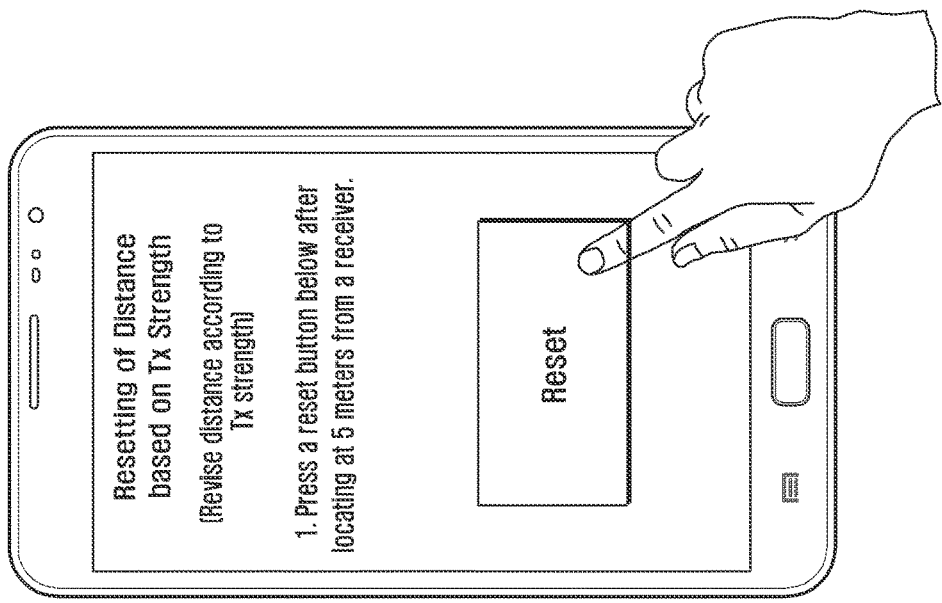
FIG. 9 is a diagram illustrating a method for resetting a transmission distance according to a transmission power of a beacon signal according to an embodiment of the present disclosure.
Figure 9:
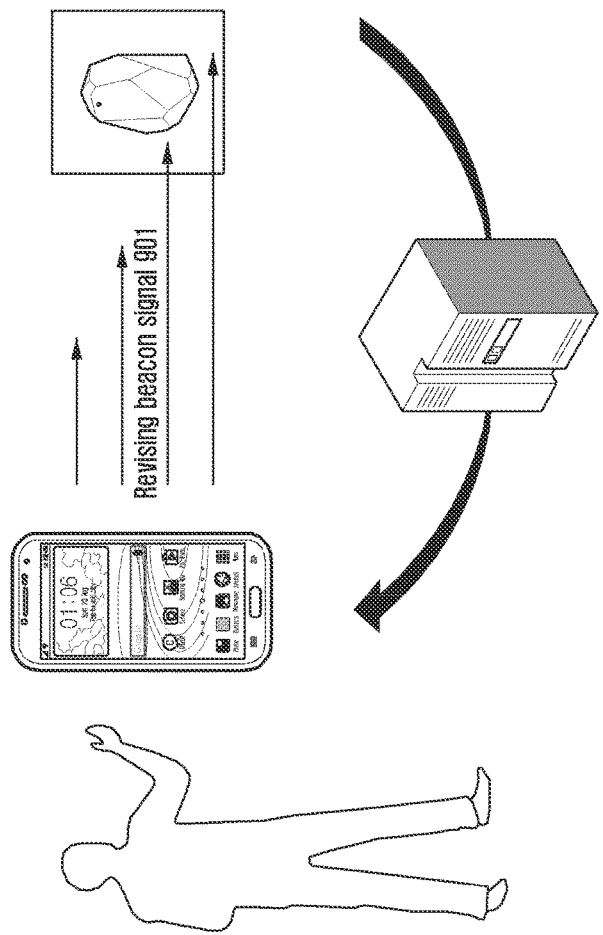

FIG. 9 is a diagram illustrating a method for resetting a transmission distance according to a transmission power of a beacon signal in accordance with an embodiment of the present disclosure.

Referring to FIG. 9, a revising beacon signal 901 is illustrated, such that, as indicated by the revising beacon signal 901, a user may send the revising beacon signal 901 to be used for resetting a transmission distance of a beacon signal through a user interface of the mobile beacon transmitter. Specifically, if a user sends a revising beacon signal at a certain location between the mobile beacon transmitter and the beacon receiver, the beacon receiver may transmit the received beacon signal to the beacon service server. For example, if beacon signals received from a distance of 5 meters have the lowest transmission power signal of 75%, the beacon service server may recognize that a distance between the mobile beacon transmitter and the beacon receiver is 5 meters when the received beacon signal has transmission power of 75%.

Figure 10:
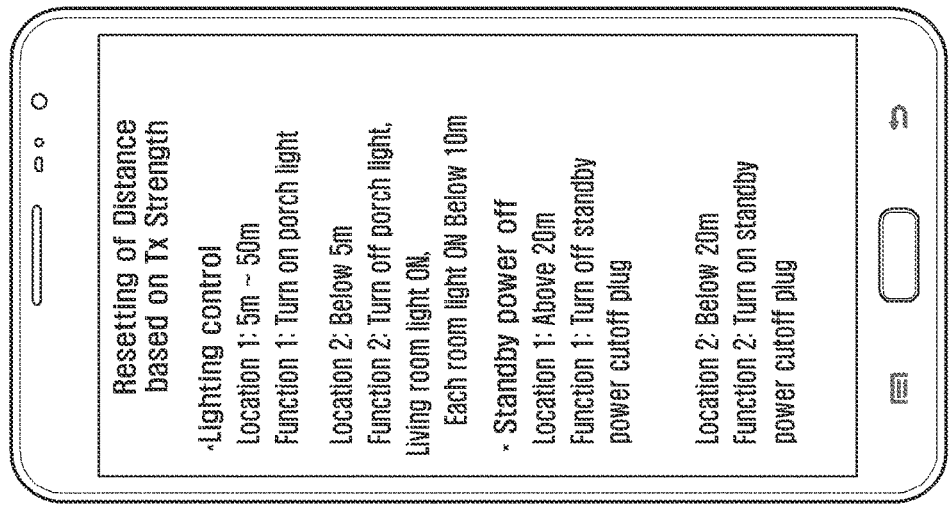
FIG. 10 is a diagram illustrating beacon service information offered depending on distance information of a mobile beacon transmitter in accordance with an embodiment of the present disclosure.
Figure 10:
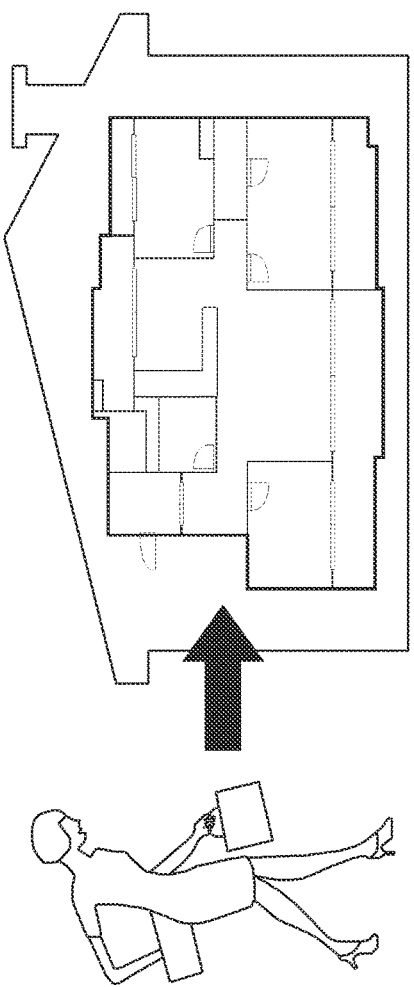

FIG. 10 is a diagram illustrating beacon service information offered depending on distance information of a mobile beacon transmitter in accordance with an embodiment of the present disclosure.

Using the above-discussed method for transmitting a beacon signal by varying transmission power and then calculating a distance between the mobile beacon transmitter and the beacon receiver, more various beacon services may be offered.

Referring to FIG. 10, a beacon service for controlling a plurality of smart home appliances using a beacon signal is illustrated. Specifically, in a case where a mobile beacon transmitter is located within a specific distance from a beacon receiver fixed at any indoor position, a plurality of smart home appliances can be controlled. Namely, if a user who carries the mobile beacon transmitter enters a specific coverage, it is possible to unlock a door lock, turn on or off indoor lighting equipment, or control any other operation of various smart home appliances.

A method for controlling smart home appliances by using the mobile beacon transmitter may have three types, as follows.

In a case of the first type, an indoor server is used for controlling the operation of indoor smart home appliances. If the beacon receiver delivers a received beacon signal to the indoor server, the indoor server may control the operation of smart home appliances by calculating a distance between the mobile beacon transmitter and the beacon receiver. In this case, the indoor server may perform the role of the above-discussed beacon service server. Namely, the indoor server may calculate a distance corresponding to a beacon signal having the lowest transmission power among all the received beacon signals, and thus control the operation of smart home appliances. According to this type method, the mobile beacon transmitter shares the predefined operation of smart home appliances with the indoor server, and then merely transmits a beacon signal. A communication for controlling smart home appliances is not needed separately.

In various embodiments, the smart home appliances may be a door lock, a television, a robot cleaner, an oven, a washing machine, a computer, a printer, a camera, a refrigerator, lighting equipment, an air conditioner, and the like. Meanwhile, a user may set a home coming mode, i.e., a case where a user enters home, so as to control the operation of the smart home appliances by using a user interface of the mobile beacon transmitter. For example, a user can set a home coming mode so that a door lock is unlocked, lighting equipment is turned on, and an air conditioner is operated when he or she enters home.

In a case of the second type, a method for controlling smart home appliances by using the mobile beacon transmitter, the smart home appliances themselves may perform the role of the beacon receiver. Specifically, since normally the smart home appliances have functions to store data and to perform a calculation as well as a communication function, the smart home appliances may receive a beacon signal directly to the mobile beacon transmitter, determine from transmission power how long the mobile beacon transmitter is distanced, and perform a predetermined control operation according to determination results. Even in this case, by using a user interface of the mobile beacon transmitter, a user may set a communication status with each of the smart home appliances, set in advance the operation of the smart home appliances depending on a distance, and transmit it to the smart home appliances. According to this type, it is possible to control smart home appliances by means of a beacon signal without separately constructing an indoor server.

In a case of the second type, a method for controlling smart home appliances by using the mobile beacon transmitter, the beacon service server may measure a distance between the mobile beacon transmitter and the beacon receiver installed indoors by using a beacon signal transmitted by the mobile beacon transmitter, and transmit measured information to the mobile beacon transmitter. According to this type, the mobile beacon transmitter may receive information about a distance from the beacon receiver and then, depending on such a distance, transmit a signal for controlling the smart home appliances to each individual smart home appliance or to an upper-layer server that controls the smart home appliances.

Meanwhile, in a case of controlling the smart home appliances by using the above-discussed method for measuring a distance according to transmission strength of a beacon signal, the mobile beacon transmitter may offer a user interface for controlling the operation of smart home appliances as shown in FIG. 10.

Specifically, such a user interface for controlling the operation of smart home appliances may offer a screen for setting particular distances between the mobile beacon transmitter and the beacon receiver, each distance corresponding to a trigger of each smart home appliance, and operation types (e.g., turn-on/off operations, etc.) at respective distances.

Figure 11:
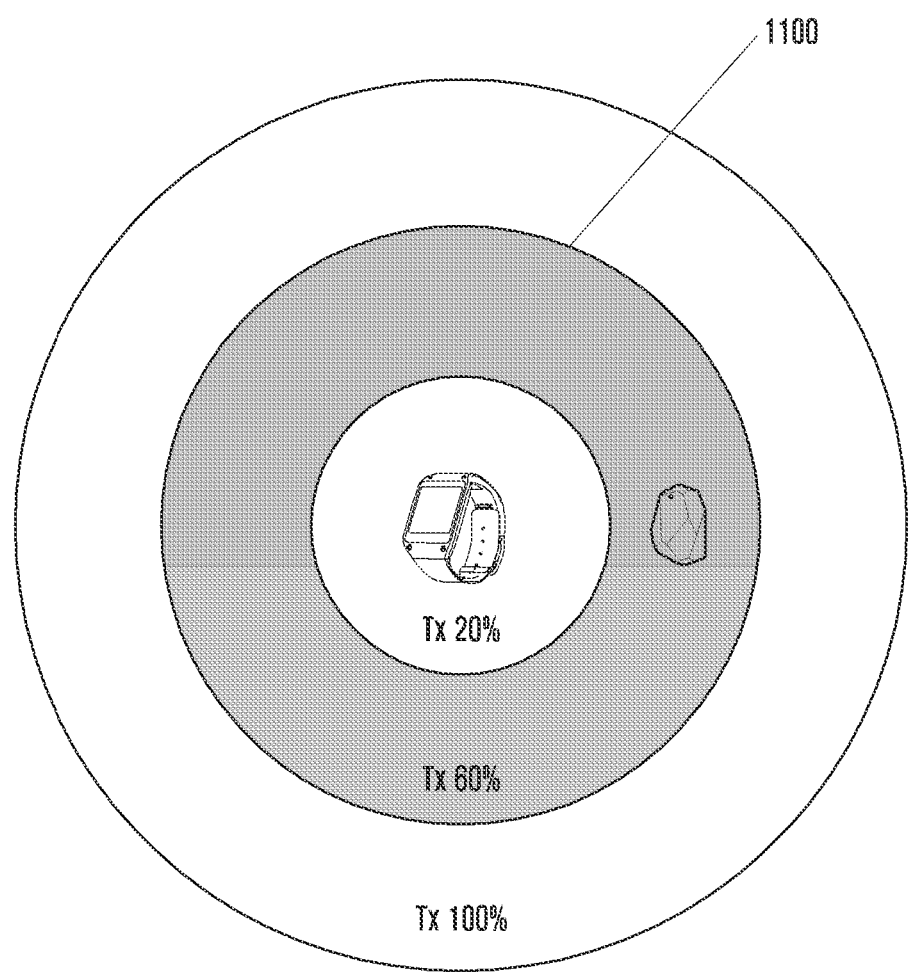
FIG. 11 is a diagram illustrating beacon service information offered depending on distance information of a mobile beacon transmitter in accordance with an embodiment of the present disclosure.

FIG. 11 is a diagram illustrating beacon service information offered depending on distance information of a mobile beacon transmitter in accordance with another embodiment of the present disclosure.

Referring to FIG. 11, a mobile beacon transmitter, a beacon and a region 1100 are illustrated, where the mobile beacon transmitter may be a wearable device. Although a wrist wearable device is shown, any other device such as a glasses-type device or a necklace-shaped device may be also used for the mobile beacon transmitter. In a case of some wearable devices such as three-dimensional (3D) glasses which are operable only within a specific range, information about a range in which the wearable device is optimally operable may be offered to the mobile beacon transmitter, based on distance information depending on transmission power of a beacon signal transmitted by the mobile beacon transmitter.

Specifically, when the mobile beacon transmitter transmits at least one beacon signal by varying transmission power according to the above-discussed method for offering a beacon service, the beacon service server that receives a beacon signal from the beacon receiver may transmit information about a calculated distance to a wearable device. Then a user having the wearable device can determine, through the received distance information, whether the wearable device is located in a specific region 1100 that allows the optimal operation of the wearable device.

The region 1100 shown in FIG. 11 indicates a region for allowing the wearable device to optimally operate when the mobile beacon transmitter sends a beacon signal with transmission power of 60%, as opposed to a transmission power of 20% or 100%.

Figure 12:
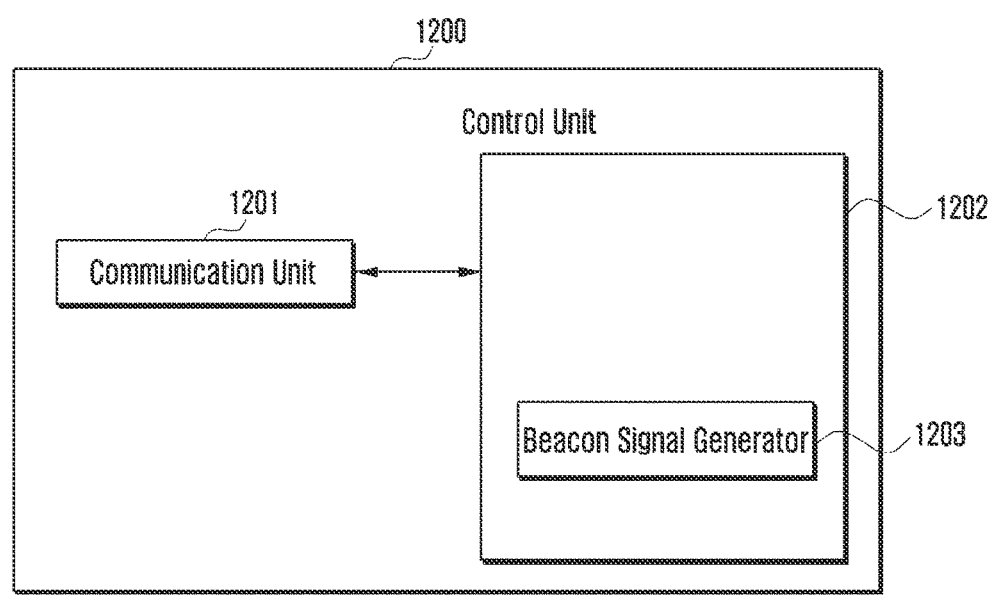
FIG. 12 is a block diagram illustrating a structure of a mobile beacon transmitter in accordance with an embodiment of the present disclosure.

FIG. 12 is a block diagram illustrating a structure of a mobile beacon transmitter in accordance with an embodiment of the present disclosure.

Referring to FIG. 12, a mobile beacon transmitter 1200 is illustrated, where the mobile beacon transmitter 1200 may include a communication unit 1201, a control unit 1202, and a beacon signal generator 1203.

According to various embodiments of the present disclosure, the mobile beacon transmitter 1200 may be implemented in various forms of devices, and other units or modules for performing their particular functions may be included selectively or inherently in the mobile beacon transmitter 1200. As a matter of convenience, it is supposed hereinafter that the control unit 1202 is configured to control the whole operation of the mobile beacon transmitter 1200.

The communication unit 1201 may perform a data communication.

The beacon signal generator 1203 may generate a beacon signal in response to the determination or instructions of the control unit 1202. Although FIG. 12 depicts the beacon signal generator 1203 as a separate module in the control unit 1202, the control unit 1202 may control the operation of the beacon signal generator 1203 as understood by those skilled in the art.

The control unit 1202 may receive authentication-related information of the mobile beacon transmitter 1200 from a server, and broadcast a beacon signal generated based on the authentication-related information. If any receiver located at an arbitrary location receives the beacon signal, the control unit 1202 may receive beacon service information corresponding to information about the receiver from the server. Here, the authentication-related information may include at least one of a unique identifier of the mobile beacon transmitter and basic information for creating an OTP to be used for authenticating the mobile beacon transmitter 1200. Additionally, the information about the receiver may be information about a geographical location of the receiver or information about a distance between the receiver and the mobile beacon transmitter 1200. Additionally, the beacon signal may include at least one of a unique identifier of the mobile beacon transmitter 1200, information about transmission power of the beacon signal, and an OTP for authenticating the mobile beacon transmitter 1200.

The control unit 1202 may broadcast a plurality of beacon signals with different transmission power values. Here, the beacon service information may be location information of the mobile beacon transmitter 1200 determined based on the transmission power value. Meanwhile, the control unit 1202 may transmit, based on the received beacon service information, a control message for controlling the receiver to the receiver. In this case, the receiver may be at least one of smart home appliances.

Figure 13:
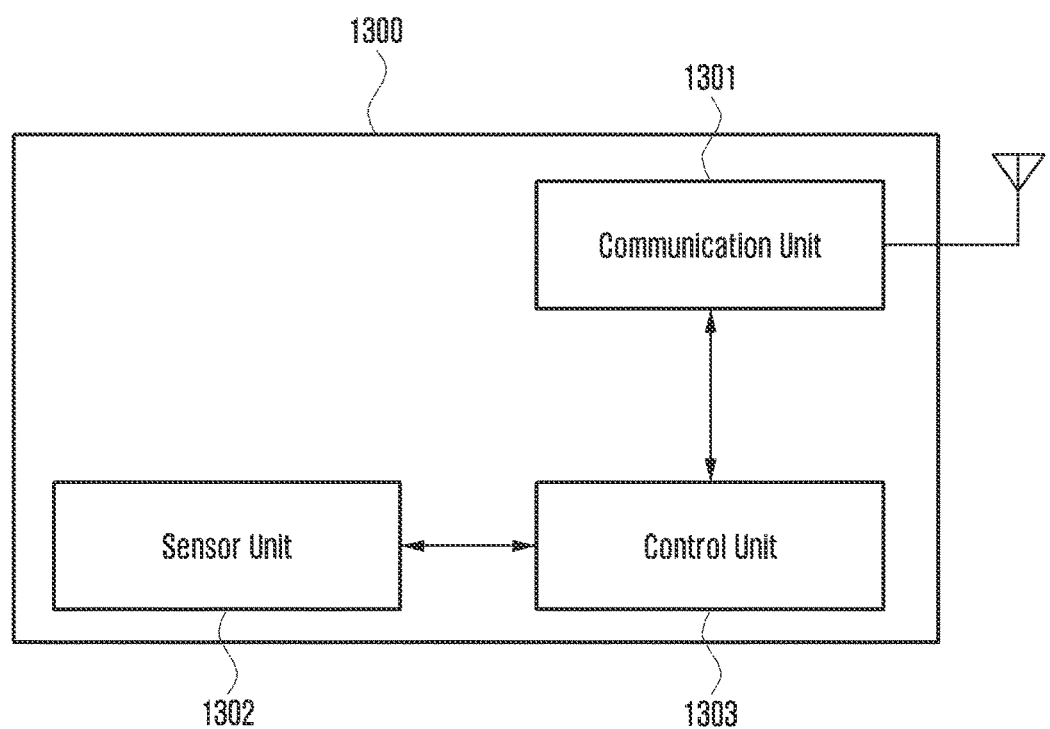
FIG. 13 is a block diagram illustrating a structure of a beacon receiver in accordance with an embodiment of the present disclosure.

FIG. 13 is a block diagram illustrating a structure of a beacon receiver in accordance with an embodiment of the present disclosure.

Referring to FIG. 13, a beacon receiver 1300 is illustrated, where the beacon receiver 1300 may include a communication unit 1301, a sensor unit 1302, and a control unit 1303.

The communication unit 1301 may perform a data communication, and the sensor unit 1302 may sense a beacon signal and then deliver the beacon signal to the control unit 1303.

Although being depicted as separate modules, the sensor unit 1302 and the control unit 1303 may be integrated into a single module as understood by those skilled in the art.

Figure 14:
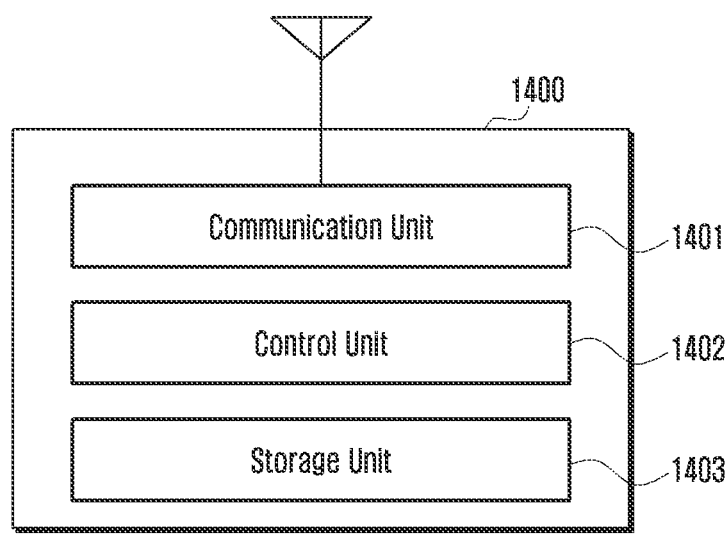
FIG. 14 is a block diagram illustrating a structure of a beacon service server in accordance with an embodiment of the present disclosure.

FIG. 14 is a block diagram illustrating a structure of a beacon service server in accordance with an embodiment of the present disclosure.

Referring to FIG. 14, a beacon service server 1400 is illustrated, where the beacon service server 1400 may include a communication unit 1401, a control unit 1402, and a storage unit 1403.

The communication unit 1401 may perform data communication.

The control unit 1402 may control the whole operation of the beacon service server 1400, including a control of the communication unit 1401.

The storage unit 1403 may store therein subscriber information and/or distance information depending on transmission power of a beacon signal.

The control unit 1402 may transmit, to a device that joins a beacon service, authentication-related information of the device for receiving beacon service information, and receive, from a receiver located at an arbitrary location, a beacon signal broadcasted by the device. Also, the control unit 1402 may authenticate the device broadcasting the beacon signal by using the authentication-related information contained in the received beacon signal. When the device is authenticated, the control unit 1402 may transmit the beacon service information corresponding to information about the receiver to at least one of the device and the receiver. Here, the authentication-related information may include at least one of a unique identifier of the device and basic information for creating an OTP to be used for authenticating the device. Also, the information about the receiver may be information about a geographical location of the receiver or information about a distance between the receiver and the device. Here, the beacon signal may include at least one of a unique identifier of the device, information about transmission power of the beacon signal, and an OTP for authenticating the device.

Additionally, the control unit 1402 may receive a plurality of beacon signals broadcasted with different transmission power values. Here, the beacon service information may be location information of the device determined based on the transmission power value. The receiver may be at least one of smart home appliances.

According to various embodiments of this disclosure, it is possible to offer user-specialized or personalized information and a beacon service to a user through the mobile beacon transmitter.

Additionally, it is possible to measure the location of a user device through a beacon signal from the mobile beacon transmitter and also offer a variety of beacon services based on location information.

Additionally, it is possible to measure a detailed location of the mobile beacon transmitter by using beacon signals with varied transmission power.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of this disclosure as defined by the appended claims and their equivalents.

What is claimed is:

1. A method for transmitting a beacon signal to a receiver by a beacon, the method comprising:
receiving authentication-related information of the beacon from a server;
generating a beacon signal based on the authentication-related information and broadcasting the beacon signal; and
if the receiver receives the beacon signal, receiving beacon service information corresponding to information on the receiver from the server,
wherein the broadcasting of the beacon signal includes broadcasting a plurality of beacon signals with different transmission power values.

2. The method of claim 1, wherein the authentication-related information includes at least one of a unique identifier of the beacon and basic information for creating a one-time password (OTP) for authenticating the beacon.

3. The method of claim 1, wherein the information on the receiver is one of information on a geographical location of the receiver and information on a distance between the receiver and the beacon.

4. The method of claim 1, wherein the beacon signal includes at least one of a unique identifier of the beacon, information on a transmission power of the generated beacon signal, and a one-time password (OTP) for authenticating the beacon.

5. The method of claim 1, wherein the beacon service information is location information of the beacon determined based on a transmission power value.

6. The method of claim 1, further comprising:
based on the received beacon service information, transmitting a control message for controlling the receiver to the receiver.

7. The method of claim 6, wherein the receiver is a smart home appliance.

8. A method for offering a beacon service by a server, the method comprising:
transmitting, to a beacon that joins the beacon service, authentication-related information of the beacon for receiving beacon service information;
receiving, from a receiver, a beacon signal broadcasted by the beacon;
authenticating the device beacon broadcasting the beacon signal based on the authentication-related information contained in the received beacon signal; and
if the beacon is authenticated, transmitting the beacon service information corresponding to information on the receiver to at least one of the beacon and the receiver,
wherein the receiving of the beacon signal includes receiving a plurality of beacon signals broadcast with different transmission power values.

9. The method of claim 8, wherein the authentication-related information includes at least one of a unique identifier of the beacon and basic information for creating a one-time password (OTP) for authenticating the beacon.

10. The method of claim 8, wherein the information on the receiver is one of information on a geographical location of the receiver and information on a distance between the receiver and the beacon.

11. The method of claim 8, wherein the beacon signal includes at least one of a unique identifier of the beacon, information on a transmission power of the beacon signal, and a one-time password (OTP) for authenticating the beacon.

12. The method of claim 8, wherein the beacon service information is location information of the beacon determined based on a transmission power value.

13. The method of claim 12, wherein the receiver is a smart home appliance.

14. A beacon for transmitting a beacon signal, the beacon comprising:
a communication unit configured to perform a data communication; and
a control unit configured to:
receive authentication-related information of the beacon from a server,
generate a beacon signal based on the authentication-related information,
broadcast the beacon signal, and
if a receiver receives the beacon signal, receive beacon service information corresponding to information on the receiver from the server,
wherein the control unit is further configured to broadcast a plurality of beacon signals with different transmission power values.

15. The beacon of claim 14, wherein the authentication-related information includes at least one of a unique identifier of the beacon and basic information for creating a one-time password (OTP) for authenticating the beacon.

16. The beacon of claim 14, wherein the information on the receiver is one of information on a geographical location of the receiver and information on a distance between the receiver and the beacon.

17. The beacon of claim 14, wherein the beacon signal includes at least one of a unique identifier of the beacon, information on a transmission power of the beacon signal, and a one-time password (OTP) for authenticating the beacon.

18. The beacon of claim 14, wherein the beacon service information is location information of the beacon determined based on a transmission power value.

19. The beacon of claim 14, wherein the control unit is further configured to:
transmit, based on the beacon service information, a control message for controlling the receiver to the receiver.

20. The beacon of claim 19, wherein the receiver is a smart home appliance.

21. A server for offering a beacon service, the server comprising:
a communication unit configured to perform a data communication; and
a control unit configured to:
transmit, to a beacon that joins the beacon service, authentication-related information of the beacon for receiving beacon service information,
receive, from a receiver, a beacon signal broadcasted by the beacon,
authenticate the beacon broadcasting the beacon signal based on the authentication-related information contained in the beacon signal, and
if the beacon is authenticated, transmit the beacon service information corresponding to information on the receiver to at least one of the beacon and the receiver,
wherein the control unit is further configured to receive a plurality of beacon signals broadcast with different transmission power values.

22. The server of claim 21, wherein the authentication-related information includes at least one of a unique identifier of the beacon and basic information for creating a one-time password (OTP) for authenticating the beacon.

23. The server of claim 21, wherein the information on the receiver is one of information on a geographical location of the receiver and information on a distance between the receiver and the beacon.

24. The server of claim 21, wherein the beacon signal includes at least one of a unique identifier of the beacon, information on transmission power of the beacon signal, and a one-time password (OTP) for authenticating the beacon.

25. The server of claim 21, wherein the beacon service information is location information of the beacon determined based on a transmission power value.

26. The server of claim 25, wherein the receiver is a smart home appliance.

27. A non-transitory computer-readable storage medium storing instructions that, when executed, cause at least one processor to perform the method of claim the method of claim 1.

\* \* \* \* \*